United States Patent [19]

van der Lely

[11] Patent Number: 4,515,222
[45] Date of Patent: May 7, 1985

[54] SOIL CULTIVATING IMPLEMENTS

[76] Inventor: Cornelis van der Lely, 7 Brüschenrain, Zug, Switzerland

[21] Appl. No.: 447,613

[22] Filed: Dec. 7, 1982

[30] Foreign Application Priority Data

Dec. 8, 1981 [NL] Netherlands .......................... 8105506

[51] Int. Cl.³ ............................................. A01B 29/04
[52] U.S. Cl. ...................................... 172/68; 172/547; 172/554
[58] Field of Search ................ 172/68, 540, 548, 554, 172/556, 547, 123, 122, 119, 59, 113, 49, 5; 301/12 R, 65, 66, 79, 104, 43, 13 SM; 404/121

[56] References Cited

U.S. PATENT DOCUMENTS

| 607,186 | 7/1898 | Miller | 172/508 |
|---|---|---|---|
| 1,415,663 | 5/1922 | Lilleberg | 172/532 |
| 1,744,312 | 1/1930 | Jansson | 172/122 X |
| 2,140,871 | 12/1938 | Hart | 172/556 X |
| 2,242,808 | 5/1941 | Austin | 404/121 |
| 2,388,553 | 11/1945 | Kraus | 172/556 |
| 3,040,638 | 6/1962 | Atkinson | 404/121 |
| 3,616,862 | 11/1971 | Lely | 172/47 |
| 3,902,437 | 9/1975 | Lely | 172/68 |
| 3,991,830 | 11/1976 | Shepherd | 172/713 |
| 4,200,156 | 4/1980 | Lely | 172/68 |
| 4,302,129 | 11/1981 | Arenz | 172/540 |
| 4,412,588 | 11/1983 | Lely | 172/68 |

FOREIGN PATENT DOCUMENTS

| 2753083 | 8/1978 | Fed. Rep. of Germany . | |
| 1166948 | 6/1958 | France . | |
| 2489077 | 8/1981 | France . | |
| 29498 | 12/1909 | Sweden | 172/540 |
| 986352 | 3/1965 | United Kingdom | 172/540 |

Primary Examiner—Richard J. Johnson
Attorney, Agent, or Firm—Penrose Lucas Albright

[57] ABSTRACT

A soil cultivating implement which comprises a row of power-driven rotary soil working members is provided, behind said soil working members with respect to the intended direction of operative travel of the implement, with a freely rotatable roller (10) having a cylindrical carrier (11) and a plurality of projections (12) formed in integral pairs and arranged in groups or crowns at regularly spaced apart intervals along the intended axis of rotation (a) of the roller (10). In order substantially to prevent clods of earth, old roots and the like from becoming jammed between the groups or crowns of projections (12), the relatively facing sides of the groups or crowns skeletally define radially outwardly divergent surfaces (B) and a pointed scraper (17) bears against the carrier (11) between each group or crown of projections (12). The projections (12) are secured to the carrier (11) by welding seams that extend parallel or substantially parallel to the axis (a) and alternative constructions of the projections are both described and illustrated.

12 Claims, 9 Drawing Figures

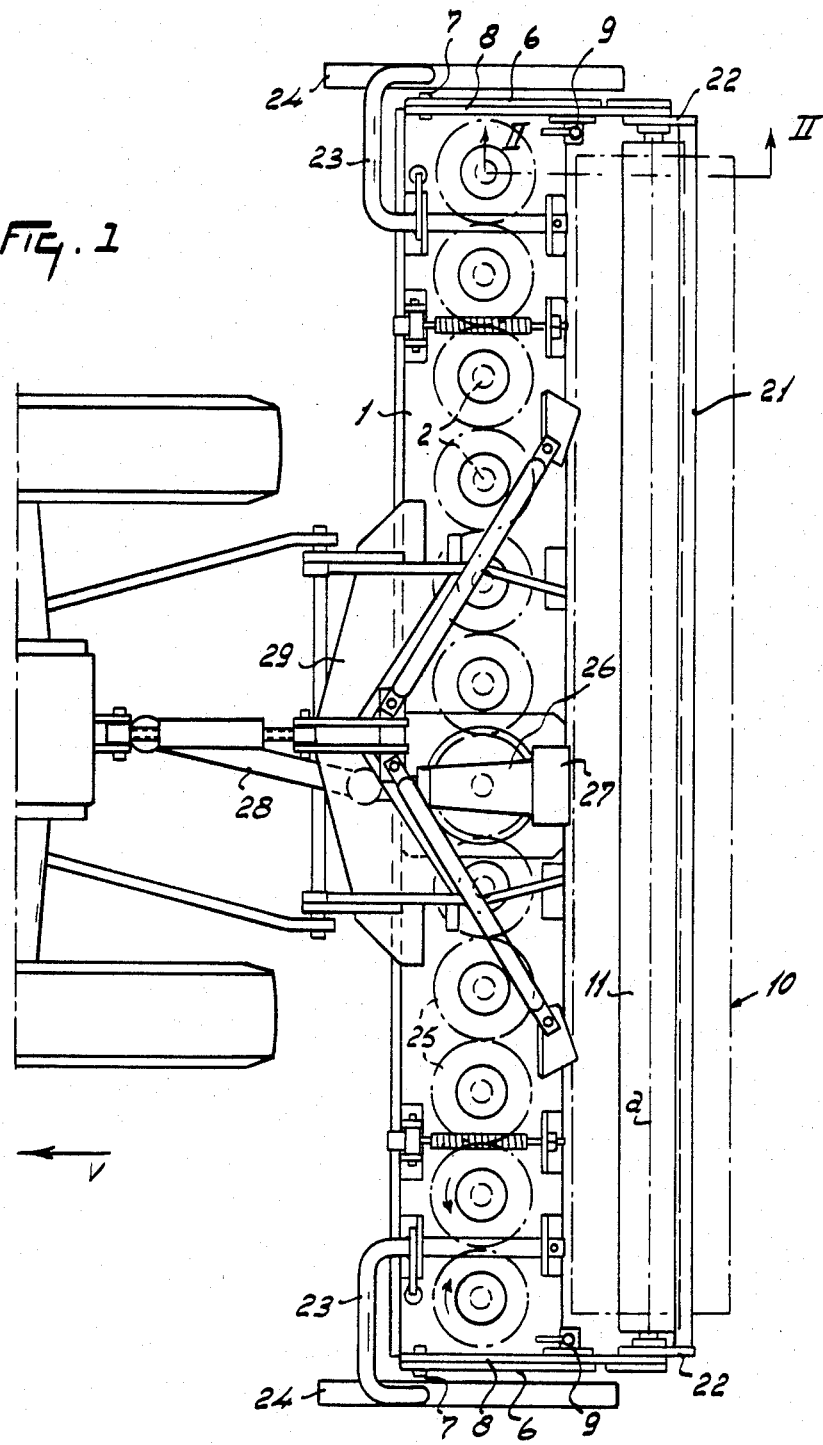

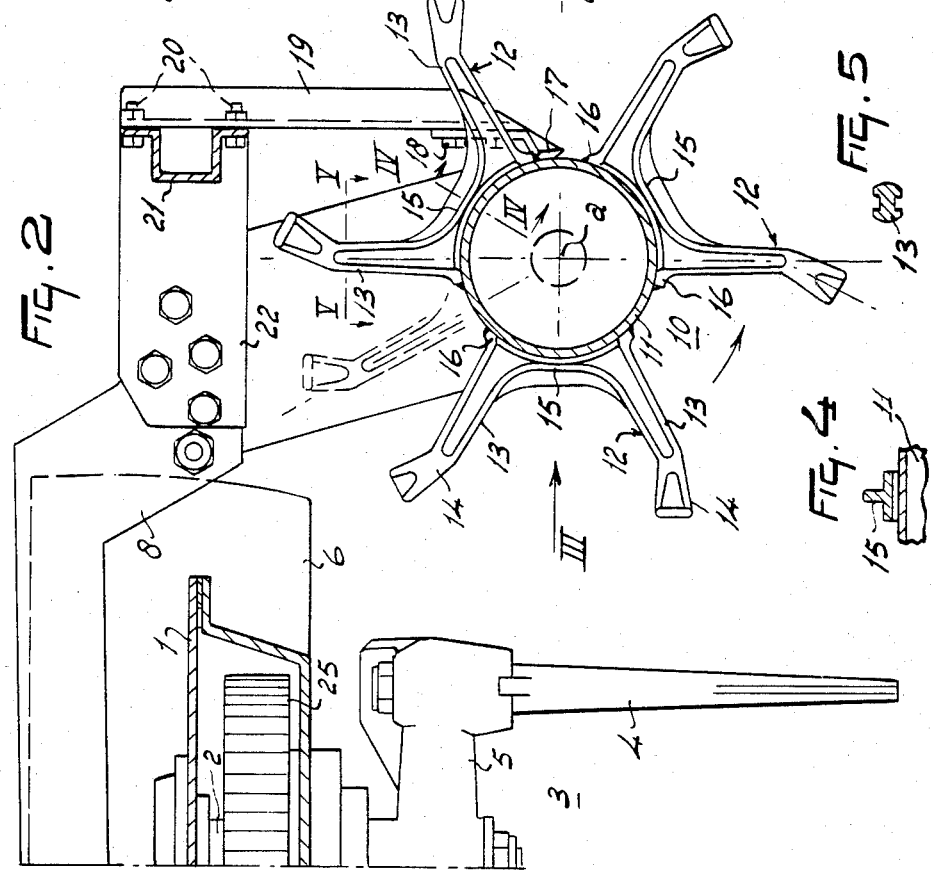

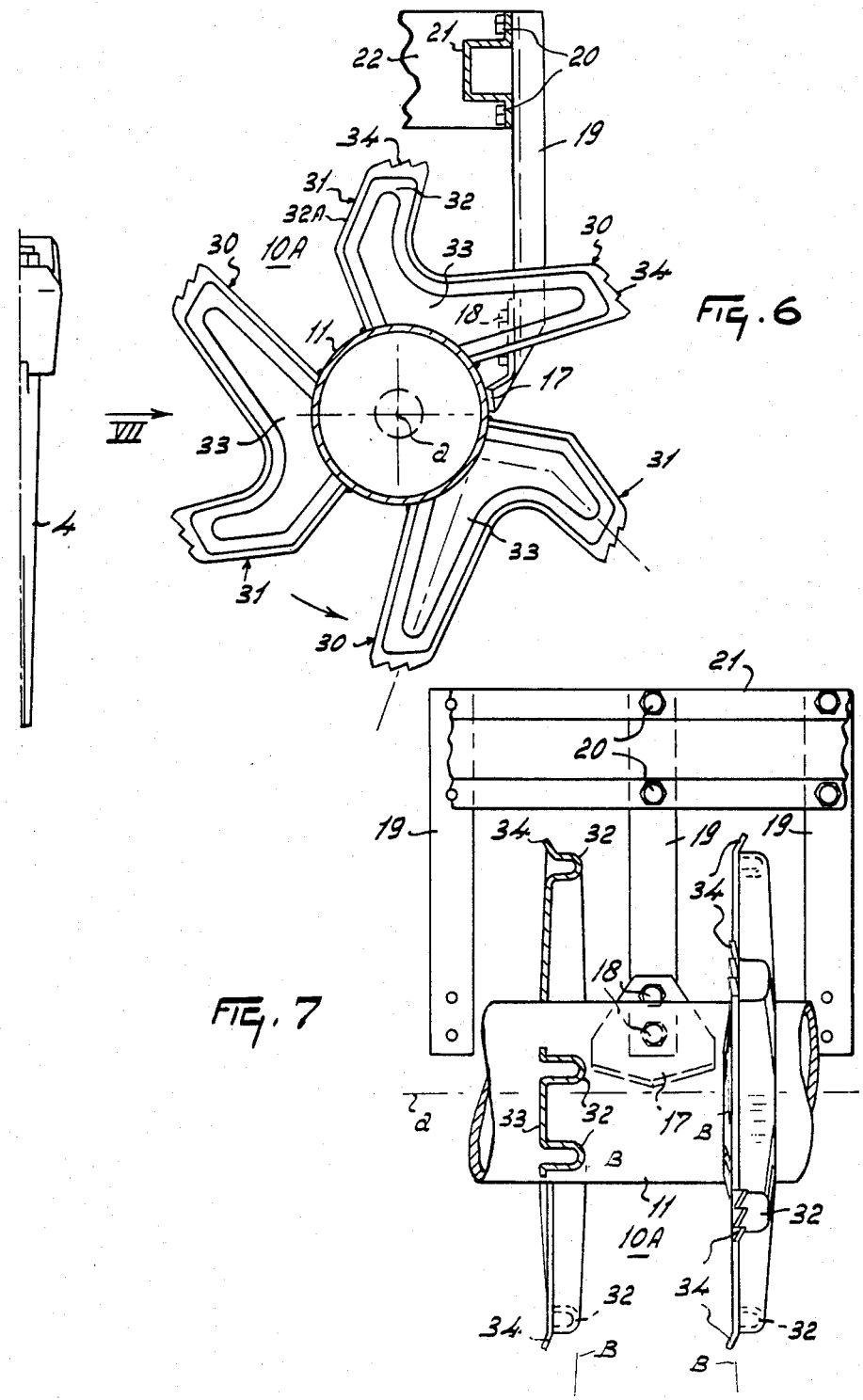

SOIL CULTIVATING IMPLEMENTS

BACKGROUND OF THE INVENTION

This invention relates to soil cultivating implements or machines of the kind which comprise a rotatable roller having elongate outwardly directed projections that are spaced apart from one another lengthwise along the roller and that are spaced apart from one another, in side-by-side relationship, when the roller is viewed lengthwise of its intended axis of rotation. The term "soil cultivating implement or machine" is shortened to "implement" or, if in the plural, "implements" throughout the remainder of this document for the sake of brevity.

Known soil cultivating implements of the kind set forth above are liable, particularly when working on heavy soil that is in a wet condition, to get clods of earth jammed between the elongate projections and this disadvantage is particularly pronounced when the soil contains foreign bodies, such as roots. The removal of such jammed clods of earth, old roots and the like from between the projections of rollers of this known kind can be a difficult, dirty and tiresome undertaking and it is, accordingly, an object of the present invention to provide a soil cultivating implement with a roller having a construction which will very considerably reduce, if not entirely eliminate, the tendency for such jamming to take place.

According to one aspect of the invention, there is provided a soil cultivating implement of the kind set forth, characterized in that relatively facing sides of the projections skeletally define surfaces which are outwardly divergent with respect to the intended axis of rotation of the roller towards the outermost circumference thereof, and in that at least one scraper is provided to extend between each such pair of skeletally defined and outwardly divergent surfaces.

By employing a construction in accordance with the invention, spaces which increase in width outwardly towards the outermost circumference of the roller are formed between the elongate projections and this enables the corresponding scrapers to act effectively even under very unfavorable working conditions so that any momentarily jammed clods of earth, old roots and the like are almost always rapidly dislodged and the roller remains uncontaminated by any large accumulations of soil, or foreign bodies unearthed from the soil, and can continue to operate in an effective manner without any need for frequent stops to remove clods of earth, large accumulations of mud, old roots or the like.

According to a second aspect of the invention, there is provided a soil cultivating implement comprising a rotatable roller having a cylindrical carrier upon which a plurality of elongate projections are mounted, characterized in that the projections are provided with fastening parts, the constructions of which are suitable for the application of welding seams extending parallel or substantially parallel to the intended axis of rotation of the roller to secure said projections in their appointed positions on the carrier. This construction enables the projections to be quickly and easily welded to the carrier so that the manufacture of the roller can be undertaken at a relatively low expense. Preferably, each elongate projection is provided, at its outer end, with at least one pointed tine or blade.

For a better understanding of the invention, and to show how the same may be carried into effect, reference will now be made, by way of example, to the accompanying drawings, in which:

BRIEF DESCRIPTION OF THE DRAWINGS

FIG. 1 is a somewhat diagrammatic plan view of a soil cultivating implement in accordance with the invention shown connected to the rear of an agricultural tractor, FIG. 2 is a section, to an enlarged scale, taken on the line II—II in FIG. 1, FIG. 3 is a view as seen in the direction indicated by an arrow III in FIG. 2, FIG. 4 is a section taken on the line IV—IV in FIG. 2, FIG. 5 is a section taken on the line V—V in FIG. 2, FIG. 6 is a similar view to FIG. 2 but illustrates an alternative embodiment, FIG. 7 is a view as seen in the direction indicated by an arrow VII in FIG. 6.

DESCRIPTION OF THE PREFERRED EMBODIMENTS

Figure 8:
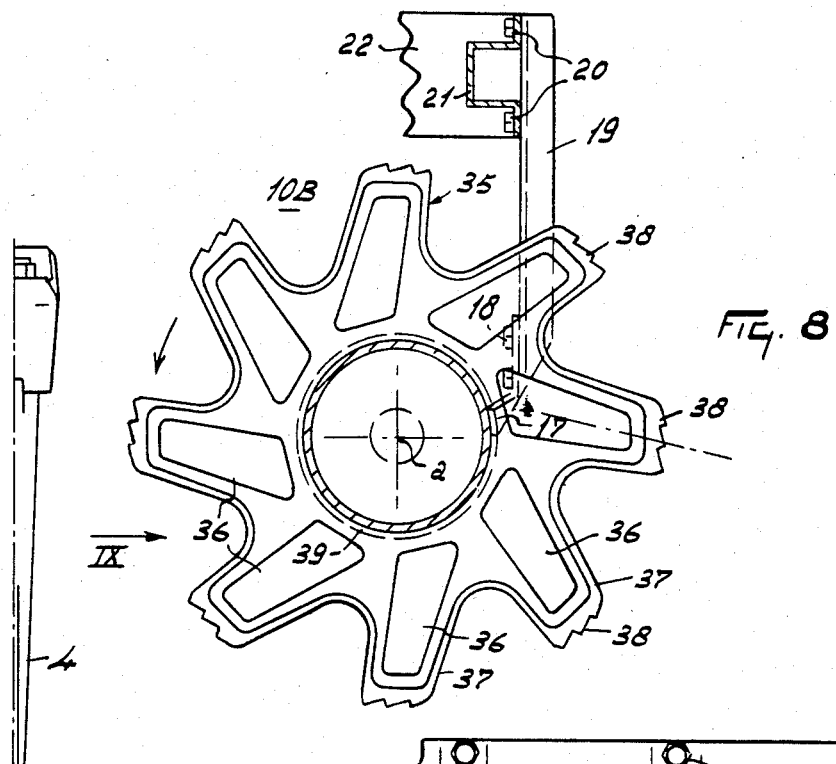
FIG. 8 is a similar view to FIGS. 2 and 6 but illustrates a third embodiment in accordance with the invention.

Referring firstly to FIGS. 1 to 5 of the accompanying drawings, the soil cultivating implement that is illustrated therein is in the form of a rotary harrow and comprises a hollow box-section frame portion 1 of elongate configuration that extends (on horizontal land) horizontally, or substantially horizontally, perpendicular (as illustrated), or at least transverse, to the intended direction of operative travel of the implement which is indicated in FIG. 1 of the drawings by an arrow V. A plurality, of which there are twelve in the example that is being described, of upwardly extending shafts 2 are rotatably journalled in bearings carried by the upper and lower walls of the hollow frame portion 1 so as to lie in a single row that is parallel to the transverse length of the frame portion 1 itself. Preferably, but not essentially, the longitudinal axis (axis of rotation) of each shaft 2 is spaced from its immediate neighbors by a distance of substantially twenty-five centimeters. Each shaft 2 will normally, as illustrated, be vertically or substantially vertically disposed when the implement is in operation. A lower region of each shaft 2 that projects downwardly from beneath the bottom of the hollow frame portion 1 carries a corresponding rotary soil working member 3 (FIG. 2), each soil working member 3 comprising a substantially horizontal carrier 5 firmly, but releasably, secured to the corresponding shaft 2, and 2 diametrically opposed soil working tools in the form of rigid tines 4 having upper fastening portions releasably engaged in sleeves at the outer ends of the carrier 5 and downwardly projecting soil working portions that project into, and break up, the soil when the implement is in use. The distance between the soil working portions of the two tines 4 of each rotary soil working member 3 is a little greater than is the distance between the axes of rotation of immediately neighboring shafts 2 so that, when the implement is in operation, the twelve, in this example, members 3 will work individual strips of land, extending in the direction V, that overlap one another to produce a single broad strip of worked soil having a width of substantially, but not necessarily exactly, three meters in the case of the example that is illustrated having the advantageous spacing between the axes of rotation of the shafts 2 that is mentioned above It is emphasized that the soil working members 3 could be of different constructions, in particular, that the soil working tools could be of other forms than the rigid tines 4 which can be seen best in FIG. 2 of the drawings, there being, if desired, only a single soil working tool or more than two thereof per soil working member 3.

Each end of the hollow frame portion 1 is closed by a corresponding side plate 6 that extends substantially vertically parallel to the direction V. As can be seen best in FIG. 2 of the drawings, each of the side plates 6 is larger in extent than the cross-sectional area of the hollow frame portion 1 and, at the top and front thereof, aligned substantially horizontal stub shafts 7 (FIG. 1) turnably connect corresponding arms 8 to the side plates 6 in positions which are such that said arms 8 extend generally rearwardly, with respect to the direction V, alongside the outer surfaces of the two side plates 6. Each arm 8 is connected, at the rear of the hollow frame portion 1, to a corresponding adjusting member 9; comprising a screw-threaded spindle, that is of a construction which is known per se, and which is therefore not illustrated in detail and does not require a detailed description. Appropriate manipulation of the two adjusting members 9 will turn the arms 8 either upwardly or downwardly relative to the frame portion 1 about the substantially horizontal axis defined by the stub shafts 7, said arms 8 remaining reliably in their chosen angular positions until fresh adjustments of the two members 9 are made.

The rearmost ends of the two arms 8, which lie a significant distance behind the frame portion 1, with respect to the direction V, carry horizontal bearings between which a ground roller 10 is mounted so as to be freely rotatable about an axis a which coincides with its own longitudinal axis. The ground roller 10 has a central cylindrical carrier 11 of circular cross-section and tubular form, said carrier 11 supporting a plurality of elongate projections 12 arranged in groups or crowns that are spaced apart from one another at substantially regular intervals lengthwise of the axis a. Each projection 12 is in the form of a rod or bar and each group or crown thereof comprises six of the projections 12 arranged in three pairs that are regularly spaced apart from one another at 120° intervals around the axis a with the two projections 12 in each pair spaced apart from one another by substantially 60° to produce a substantially 60° spacing between successive projections 12 of each group or crown considered rotationally around the axis a. Each projection 12 comprises an inner substantially radial part 13 and an outer bent part 14 that is inclined rearwardly from the corresponding part 13 with respect to the intended direction of operative rotation of the roller 10 (see FIG. 2) and that is also inclined obliquely outwardly from the inner part 13 with respect to the plane of rotation of the group or crown concerned (see FIG. 3). The inner part 13 of each projection 12 tapers outwardly away from the carrier 11 and has the cross-section that can be seen best in FIG. 5 of the drawings, that is to say, a squat and thickened I-shaped cross-section. The upper and lower cross-bars of the substantially I-shaped cross-section are perpendicular, or substantially perpendicular, to the corresponding plane of rotation A—A (FIG. 3) which plane is, of course, perpendicular to the axis of rotation a. It will be apparent from FIGS. 2 and 3 of the drawings that the outer parts 14 of the projections 12 taper outwardly towards their free ends and are bent over from the corresponding plane of rotation A—A alternately in opposite directions considered rotationally round the axis a, the inclination of each outer part 14 to the corresponding plane A—A preferably being substantially 45° and not more than substantially 50°. The rearward inclination of each outer part 14 relative to the corresponding inner part 13 and with respect to the intended direction of operative rotation of the roller 10 has, as can be seen best in FIG. 2 of the drawings, a magnitude of substantially 30°. The outward taper throughout substantially the whole of the length of each outer part 14 that can be seen in FIG. 3 of the drawings has is produced by a flattening of said part 14 which is, in fact, substantially wedged-shaped as its free outermost extremity is approached (see FIG. 2).

It will be apparent from FIG. 2 of the drawings that each substantially wedge-shaped outer part 14 becomes broader towards its free end or tip as seen in that Figure whereas, as seen in FIG. 3 of the drawings, the previously mentioned taper towards the free end or tip is evident. Each outer part 14 comprises substantially one quarter of the total length of the corresponding projection 12 and it can be seen in FIGS. 2 and 3 of the drawings that each group or crown of projections 12 is turned angularly through substantially 30° about the axis a as compared with each neighboring group or crown with the result that imaginary helical lines could be drawn along the outermost cylindrical circumference of the roller 10 joining the tips of projections 12 that are successively displaced about the axis a by angles of substantially 30°.

The two projections 12 of each of the aforementioned pairs thereof are integrally produced, by forging, from single pieces of metallic material, each such integral pair having an approximately U-shaped formation with the limbs of the U inclined to one another at an angle of substantially 60°. Each integral pair comprises a fastening portion 15 that lies between the two limbs of the approximately U-shaped configuration that comprises the corresponding pair of projections 12. In order to improve the strength of each fastening portion 15, it includes a flange and is of substantially T-shaped cross-section as can be seen best in FIG. 4 of the drawings, the "upright" of the "T" being said flange and the cross-bar thereof being the part which is shaped substantially to match the curvature of the surface of the cylindrical carrier 11. It will be apparent that the flange is provided only in a substantially central region of the fastening portion 15 of each integral pair of projections 12 and, from FIG. 2 of the drawings, that the whole of each fastening portion 15 subtends an angle of substantially 90° at the axis a. The opposite ends of each fastening portion 15 comprise corresponding supporting feet 16 which are acutally the inner or root ends of the relatively remote surfaces of the two inner parts 13 of the two projections 12 of each pair. Each supporting foot 16 is shaped to enable the corresponding pair of projections 12 to be welded to the carrier 11 whereas the remainder of each fastening portion 15, that lies between the corresponding pair of feet 16, remains free of positive attachment to the carrier 11. The two welding seams that coincide with the edges of the two feet 16 of each integral pair of projections 12 both extend parallel or substantially parallel to the axis a and this arrangement enables each such pair to be firmly and reliably attached to the carrier 11 by a minimum of simple welding operations that markedly reduce the cost of producing the roller 10 as compared with conventional methods of production.

Scrapers 17 are arranged between successive groups or crowns of the projections 12, each scraper 17 comprising a blade or foot having a shallow V-shaped point. This point is also shaped to match the cylindrical curvature of the carrier 11 so that the cylindrically curved sides of each V-shaped point bear against the carrier 11 throughout their lengths. The upper ends of the edges defining the limbs of each shallow V-shaped point merge into the lower ends of corresponding straight limbs that are parallel or substantially parallel to the aforementioned planes of rotation A—A, these straight edges merging, in turn, into upwardly convergent straight edges having upper ends which are joined together by an edge that is parallel or substantially parallel to the axis of rotation a. Each scraper 17 is releasably secured by a pair of vertically spaced bolts 18 to the lower end of a corresponding holder 19 that is of T-shaped cross-section, the "upright" of the T being located at the rear side, with respect to the direction V, of each holder 19. As can be seen in FIG. 2 of the drawings, the "upright" of each holder 19 is bevelled at the lower end of that holder so as to merge into the rear of the corresponding scraper 17. The upper end of each holder 19 is releasably secured by vertically spaced apart bolts 20 to the substantially vertical rims of a beam 21 of channel-shaped cross-section that is formed from sheet metal, the opposite ends of the substantially horizontally extending beam 21 being fastened to corresponding support plates 22 and said support plates 22 being themselves releasably secured to downwardly inclined rear portions of the arms 8 by assemblies of horizontal bolts (see FIG. 2).

Immediately beyond each of the side plates 6 of the hollow frame portion 1, there is a corresponding substantially vertically disposed shield plate 24 (FIG. 1) which shield plate 24 extends parallel to the immediately neighboring side plate 6 concerned and to the direction V. The shield plates 24 co-operate with the tines 4 of the immediately neighboring soil working members 3 in working the soil at the margins of the broad strip thereof that is produced by the implement in substantially the same thorough manner as is accomplished by the co-operation of neighboring pairs of soil working members 3 at locations closer to the center of the implement. In addition, each shield plate 24 serves to prevent stones and other hard objects from being flung laterally of the path of travel of the implement by the tines 4 and thus very greatly reduces the danger of damage or injury being caused in this way. Each shield plate 24 is carried by a corresponding single arm 23, each arm 23 having a portion which extends substantially horizontally parallel to the direction V at a location above the hollow frame portion 1 and at a short distance from the associated end of that frame portion. The portion of each arm 23 that has just been mentioned is turnably mounted in two brackets carried by the top of the hollow frame portion 1 and can thus pivot about an axis coinciding with the longitudinal axis of the portion concerned. The lower edges of the shield plates 24 are arranged to slide over the ground in the direction V and the pivotal mounting of each arm 23 enables the shield plates 24 to turn upwardly and downwardly, as may be required, to match undulations in the surface of the ground that may be met with during travel in the direction V. In addition, should a large stone or other hard object become momentarily trapped between one of the shield plates 24 and the immediately neighboring soil working member 3, the shield plate 24 concerned can deflect outwardly and upwardly to allow the stone or other hard object to be released without causing damage. Once such an object has been released, gravity immediately causes the deflected shield plate 24 to move back downwardly and inwardly to substantially its optimum position for co-operation with the immediately neighboring soil working member 3.

Each rotary shaft 2 is provided, inside the hollow frame portion 1, with a corresponding straight-toothed or spur-toothed pinion 25, the twelve (in this embodiment) pinions 25 being of such sizes that each of them has its teeth in mesh with those of the or each of its immediately neighbors. With this arrangement, each pinion 25 will rotate, together with the corresponding shaft 2 and soil working member 3, in the opposite direction to the or each immediately neighboring similar assembly as indicated by small arrows for two such immediately neighboring assemblies in FIG. 1 of the drawings. One of the center pair of shafts 2 in the single row thereof has an upward extension through the top of the hollow frame portion 1 into a gear box 26 that is secured in position on top of the frame portion 1. Bevel pinions and substantially horizontal shafts within the gear box 26 place this extension of one of the shafts 2 in driven connection with a rotary input shaft of the gear box 26 that projects forwardly from the front thereof in substantially the direction V, said input shaft being splined or otherwise keyed. A change-speed gear 27 is provided at the rear of the gear box 26, with respect to the direction V, and includes means by which the transmission ratio between the rotary input shaft of the gear box 26 and the upwardly extended shaft 2 can be changed. The change-speed gear 27 may be of a construction which is known per se and will not be described in detail. It enables the speed of rotation of the soil working members 3 to be increased or decreased, as may be desired, without needing to alter the speed of rotation that is applied to the rotary input shaft of the gear box 26. A telescopic transmission shaft 28 which is of a construction that is known per se, having universal joints at its opposite ends, is employed to place the rotary input shaft of the gear box 26 in driven connection with the rear power take-off shaft of an agricultural tractor or other operating vehicle in the manner shown somewhat diagrammatically in FIG. 1 of the drawings. A central region of the top of the hollow frame portion 1 is provided, at the front, with a coupling member or trestle 29 which is of substantially triangular configuration as seen in front or rear elevation. The coupling member or trestle 29 is constructed to co-operate with rearmounted three-point lifting device or hitch of the agricultural tractor or other vehicle which moves and operates the implement. Downwardly and rearwardly divergent tie beams strengtheningly connect locations close to the apex of the coupling member or trestle 29 to widely spaced apart locations at the top and rear of the hollow frame portion 1.

In the use of the soil cultivating implement that has been described with reference to FIGS. 1 to 5 of the drawings, the coupling member or trestle 29 is employed to connect the implement to the three-point lifting device or hitch at the rear of an agricultural tractor or other operating vehicle and the known telescopic transmission shaft 28, having universal joints at its opposite ends, is employed to place the rotary input shaft of the gear box 26 in driven conection with the rear power take-off shaft of the same tractor or other vehicle. Adjustments that may need to be made, before the implement commences work, include establishing an appropriate transmission ratio in the change-speed gear 27 and setting the maximum working depth of the tines 4 of the soil working members 3 to an appropriate value by upward or downward displacement, if required, of the roller 10 relative to the frame portion 1 and soil working members 3 employing the known adjusting members 9 for this purpose. It is the level of the roller 10, relative to that of the remainder of the implement, which principally determines the maximum depth of penetration of the tines 4 into the soil possible when the implement is in use and the adjustments which have just been mentioned will, of course, be made primarily having regard to the nature and condition of the soil that is to be worked and the particular purpose of the harrowing/cultivating operation.

The obliquely inclined outer parts 14 of the projections 12 normally provide sufficient support from the ground surface, when the implement is in operation, since each of them defines a relatively large area of contact with the ground surface. These outer parts 14 of the projections 12 are also effective in producing an additional crumbling action upon earth ejected rearwardly, with respect to the direction V, in a fan-shaped stream by the rapidly rotating soil working members 3. In addition, the wedge-shaped outer parts 14 of the projections 12 can be relied upon to cause some degree of consolidation of the surface of the ground just worked by the tines 4. The scrapers 17 that are arranged between the groups or crowns of projections 12 ensure that no significant clods of earth, old roots and the like become jammed between the projections 12 and this is accomplished because, as can be seen best in FIG. 3 of the drawings, the relatively facing sides of the projections 12 in two neighboring groups or crowns thereof skeletally define surfaces B which are outwardly divergent with respect to the axis a towards the outermost circumference of the roller 20. Thus, each scraper 17 tends to urge any momentarily jammed clod of earth, old root or the like substantially radially outward from between two outwardly divergent skeletally defined surfaces B thus quickly dislodging any clod or the like that has become momentarily jammed between those surfaces B.

The particular construction of each scraper 17 that has been described and that is illustrated in the drawings enhances the dislodging effect of that scraper since the upwardly and rearwardly bevelled rear edge (see FIG. 2) thereof combines with the similarly inclined rear surface of the corresponding holder 19 in guiding a dislodged clod of earth, old root or the like upwardly and rearwardly out from between the projections 12. As previously mentioned, the integral pairs of projections 12 can readily be fastened in their appointed positions on the carrier 11 by means of the corresponding fastening portions 15, the welding seams between the supporting feet 16 and the carrier 11, that extend substantially parallel to the axis a, being employed for this purpose. The supporting feet 16 alone provide ample attachment to the carrier 11, by way of the welding seams, the region of each fastening portion 15 which lies between each pair of feet 16 not being directly fastened to the carrier 11 so that it does not need to be accurately and precisely shaped thus avoiding an accurate finishing operation during manufacture with a corresponding decrease in the expense thereof.

FIGS. 6 and 7 of the drawings illustrate an alternative embodiment in which, however, parts that are similar, or identical, to the embodiment of FIGS. 1 to 5 are indicated by the same reference numerals as are employed in those Figures and will not be described in detail again. In the embodiment of FIGS. 6 and 7, a roller 10A is provided which roller comprises the previously described carrier 11 and groups or crowns of elongate projections 30 and 31 that are formed in pairs from single pieces of sheet metal by punching and profiling operations. The arrangement and spacing of the projections 30 and 31 is effectively the same as that of the embodiment of FIGS. 1 to 5, there being six projections 30/31 in each group or crown spaced apart from one another at substantially 60° intervals around the axis a (see FIG. 6) and each group or crown being turned through substantially 30° about the axis a relative to its immediate neighbors (see FIG. 7). Each integral pair of projectins 30 and 31 has a continuous stiffening rib 32 close to, but not actually at, its periphery, said rib 32 enclosing a central flat portion 33 and itself being enclosed by an outermost rim 32A. The opposite ends of the rib 32 and the rim 32A of each integral pair of projections 30 and 31 abut against the outer curved surface of the carrier 11 (see FIG. 6). The longitudinal axis of each projection 30 is substantially tangential to an imaginary circle centered upon the axis a and each projections 30 tapers outwardly towards its free end both as seen in FIG. 6 of the drawings and as seen in FIG. 7 thereof. Each projection 31 is of angular configuration comprising an inner part whose longitudinal axis is substantially, although not exactly, radially disposed with respect to the axis a and an outer part whose longitudinal axis is inclined to that of the inner part and is tangential with respect to an imaginary circle centered upon the axis a. Each of these two parts of each projection 31 comprises substantially half the total length of that projection 31 and, as in the case of each projection 30, each projection 31 tapers outwardly both as seen in FIG. 6 of the drawings and as seen in FIG. 7 thereof. It can also be seen in FIG. 6 of the drawings that each projection 30, and the outer part of each projection 31, is inclined rearwardly with respect to the intended direction of operative rotation of the roller 10A that is indicated by an arrow in FIG. 6. Once again, the relatively facing sides of the projections 30 and 31 skeletally define surfaces B (FIG. 7) which are outwardly divergent with respect to the axis a towards the outermost circumference of the roller 10A, there being one of the scrapers 17 between each such pair of outwardly divergent skeletally defined surfaces B.

The inner ends of the integral pairs of projections 30 and 31 afford feet which, due to the presence of the rib 32, define welding seams that extend parallel or substantially parallel to the axis a. The rim 32A is somewhat enlarged at the outer end of each projection 30 and 31 and, in these regions, the rim 32A is provided with three saw-teeth 34 as can be seen best in FIG. 7 of the drawings. Each set of teeth 34 is bent over with respect to the plane of rotation of the corresponding group or crown of projections 30 and 31 at an angle of substantially 30° and in a direction which is opposite to that of each immediately neighboring set of teeth 34 considered rotationally around the axis a in the same group or crown of projections 30 and 31. Once again, as in the first embodiment, the integral pairs of projections 30 and 31 can be quickly and easily formed from single pieces of sheet metal and can simply and easily be secured in their appointed positions on the carrier 11 by welding seams that extend parallel or substantially parallel to the axis a. This greatly facilitates easy, rapid and inexpensive manufacture while allowing roller 10A to provide reliable support to the implement on the ground surface since it bears against that surface by way of outer end portions of the rims 32A and ribs 32. The teeth 34, with which the outer end portions of the rims 32A are provided, are capable of breaking or crumbling any lumps of soil that may exceptionally be left lying upon the ground surface after treatment by the immediately foregoing tines 4.

Figure 9:
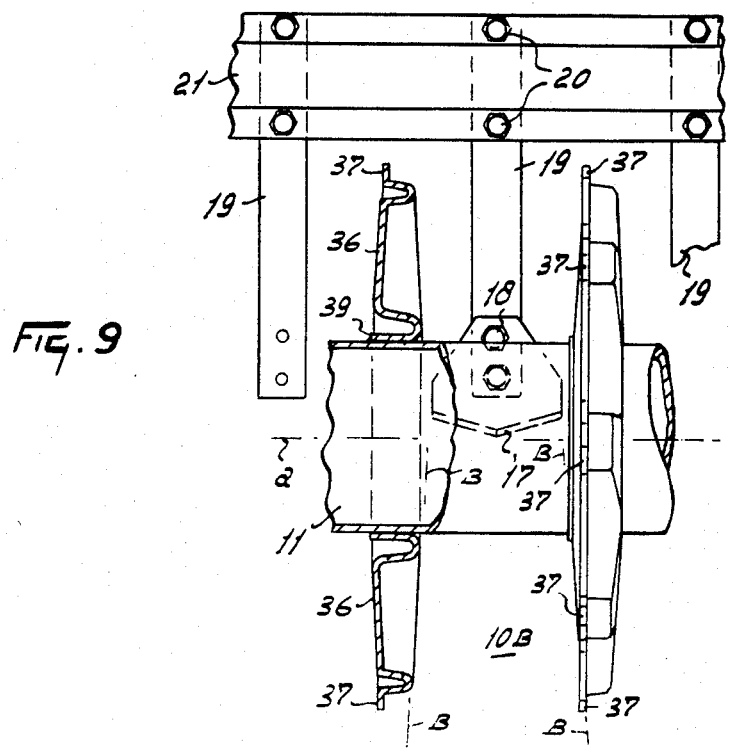
FIG. 9 is a view as seen in the direction indicated by an arrow IX in FIG. 8.

FIGS. 8 and 9 of the drawings illustrate a third embodiment of a soil cultivating implement in accordance with the invention and, once again, parts that have previously been described in connection with the embodiment of FIGS. 1 to 5 of the drawings are indicated by the same references in FIGS. 8 and 9 and will not be described in detail again. In this embodiment, a ground roller 10B is provided which comprises the previously described carrier 11, said carrier 11 supporting a plurality of regularly spaced apart groups or crowns of projections 35. However, in this case, each group or crown of projections 35 is formed integrally from a single piece of sheet metal by an appropriate punching and shaping operation. Each group or crown comprises eight of the projections 35 that are spaced apart from one another at substantially 45° intervals around the axis a with the longitudinal axis of each projection 35 inclined rearwardly in an outward direction with respect to the intended direction of operative rotation of the roller 10B that is indicated by an arrow in FIG. 8. Each projection 35 is outwardly tapering both as seen in FIG. 8 of the drawings and as seen in FIG. 9 thereof. Each projection 35 has a flat central portion 36 which is inclined by a few degrees (see FIG. 9) to the plane of rotation of the group or crown of projections 35 concerned. Each central portion 36 is surrounded by shaped portions of the metal sheet from which the group or crown concerned is made and it will be seen in FIG. 9 of the drawings that, at the innermost circumference thereof, each metal sheet defines a central circular recess having a ring-shaped inner edge 39. During manufacture, the integral groups or crowns of projections 35 are slid lengthwise along the carrier to appropriate positions where each edge 39 is firmly and reliably secured to the carrier 11 by series of welding seams that extend parallel or substantially parallel to the axis a.

Each group or crown of projections 35 has a continuous rim 37 around its outer edge which rim 37 is enlarged at the outermost ends of the projections 35 to form portions which each have three saw-teeth 38. It is preferred that each group or crown of projections 35 should be angularly staggered around the axis a as compared with its immediate neighbors along that axis and, when each group or crown has eight of the projections 35, as illustrated, an angular staggering of 22½° is preferred between immediately neighboring groups or crowns since this provides eight helical lines of teeth 38 around the skeletally defined outermost surface of the roller 10B. Although shown in FIG. 9 of the drawings as being substantially radially disposed, the outermost portions of the rims 37 that carry the teeth 38 may be successively oppositely inclined to the planes of rotation of the groups or crowns of projections as described for the teeth 34 in the embodiment of FIGS. 6 and 7 of the drawings. Once again, the projections 35 taper outwardly towards their free ends both as seen in FIG. 8 and FIG. 9 of the drawings and it will be clear from FIG. 9 that the relatively facing sides of the projections 35 skeletally define surfaces B which are outwardly divergent with respect to the axis a, one of the scrapers 17 being provided between each such outwardly divergent pair of skeletally defined surfaces B. In this embodiment, the flat portions 36 skeletally define the surface B at one side of each group or crown of projections 35 whereas those shaped portions of the plate which surround the flat portions 36 skeletally define the surface B at the opposite side of each group or crown of projections 35.

The integral groups or crowns of projections 35 can be manufactured in an efficient, rapid and inexpensive manner and can readily and reliably be secured in their appointed positions on the carrier 11 by welding seams which fasten the inner edges 39 to said carrier 11 and that extend parallel or substantially parallel to the axis a. It is preferred that the carrier 11 should have a diameter of substantially fifteen centimeters and that the overall diameter of each of the described rollers 10, 10A and 10B should be substantially forty centimeters.

I claim:

1. A soil cultivating implement comprising a frame and a rotatable elongated roller mounted on said frame, said roller having an outer periphery defined by elongated outwardly directed projections, these projections being spaced apart from one another along the length of the roller and being positioned in side-by-side relationship, neighboring projections having inner parts with relatively facing inner side-surfaces which are substantially parallel to the implement's usual direction of travel and which skeletally define planes diverging outwardly with respect to said roller's axis of rotation towards the outermost circumference of said roller, each of said neighboring projections further having outer ground-engaging parts extending outwardly from said inner parts, said inner parts being substantially in a plane radial with respect to the axis of rotation of the roller, said outer parts being bent over away from a plane radial to said axis, each said inner part converging as it extends outwardly both seen in a direction parallel to the roller's axis of rotation and as seen in a direction which is radial with respect to said axis, a scraper being mounted spaced above the ground surface and to extend between said neighboring projections, said scraper cooperating with said outwardly diverging side-surfaces to dislodge soil and debris from said roller during said roller's rotation.

2. An implement according to claim 1, wherein said projections have inner fastening parts that are weldable by seams that extend substantially parallel to the axis of rotation of said roller.

3. An implement as claimed in claim 1, wherein each elongate projection has an outermost end comprising a wedge or tooth.

4. An implement according to claim 1, wherein said roller has a cylindrical carrier and the elongate projections each comprise an inner fastening portion having a shape which substantially matches that of the cylindrical surface of the carrier.

5. An implement according to claim 6, wherein the elongate projections are comprised by sheet material that is profiled in a pressing operation.

6. An implement according to claim 4, wherein said projections are formed in integral pairs from single pieces of material by forging, each integral pair being substantially U-shaped and said pairs being arranged on the carrier in groups or crowns.

7. An implement according to claim 6, wherein the base of each substantially U-shaped integral pair of projections is the fastening portion and is concave and circular in shape at the side thereof, remote from outer projection ends, supporting feet being located adjacent the opposite ends of each fastening portion and said feet defining the positions of welding seams that extend substantially parallel to the axis of rotation of the roller, the region of each fastening portion between its corresponding feet being free of direct attachment to said carrier.

8. An implement according to claim 1, wherein each projection has a flat and elongated central portion that is bordered with profiled portions.

9. An implement as claimed in claim 1, wherein said projections are mounted on a central cylindrical carrier and said scraper has a substantially V-shaped point which is profiled to contact the outer periphery of said carrier, said scraper having upwardly extending edges that are contained in planes which are substantially perpendicular to the axis of roller rotation.

10. A soil cultivating implement comprising a frame and a rotatable elongated roller mounted on said frame, said roller having an outer periphery defined by elongated outwardly directed projections, said projections being spaced apart from one another along the length of said roller and being positioned in a side-by-side relationship, neighboring projections of said projections having inner parts with relatively facing inner side-surfaces which are substantially parallel to the implement's usual direction of travel and which skeletally define planes diverging outwardly with respect to said roller's axis of rotation towards the outermost circumference thereof, said inner parts each having a squat and thickened substantially I-shaped cross section and converging as it extends outwardly both as seen in directions parallel and radial to said axis of rotation, each of said inner parts being substantially within a plane radial with respect to said roller's axis of rotation, each said projection further having outer ground-engaging parts extending outwardly from said inner parts, said outer parts being bent over away from a plane radial to said axis, a scraper being mounted to extend between said neighboring projections, said scraper operatively cooperating with said outwardly diverging surfaces to dislodge soil and debris from said roller during said roller's rotation.

11. An implement according to claim 10, wherein said outer bent-over part of each said projection is substantially wedge-shaped towards its free end, the width of the wedge increasing towards that free end, each bent-over part being inclined to the plane of rotation of the corresponding projection and also inclined rearwardly with respect to the normal direction of rotation of said roller.

12. A soil cultivating implement comprising a frame and a rotatable elongated roller mounted on said frame, said roller having a outer periphery defined by elongated outwardly directed projections, said projections being spaced apart from one another along the length of said roller and being positioned in a side-by-side relationship, neighboring of said projections having inner parts with relatively facing side-surfaces which are substantially parallel to the implement's usual direction of travel and skeletally define planes diverging outwardly from said inner parts, said roller having a central cylindrical carrier and each said projection having a fastening portion that is shaped to conform to said carrier, said projections having profiled ribs that extend from said fastening portions to proximate said projections' outer ends, each said end comrising a tooth which extends from a part adjoining one of said ribs, said one rib being shaped to project from a plane that is perpendicular to the axis of said roller's rotation, a scraper being mounted to extend between neighboring projections and said scraper cooperating with said outwardly diverging surfaces to dislodge soil and debris from said roller during said roller's rotation, said scraper being mounted on a substantially vertically disposed holder, the lowermost end of said holder being bevelled at the rear and substantially in line with a V-shaped point of said scraper.

* * * * *